United States Patent
Roesner et al.

(10) Patent No.: US 11,270,180 B2
(45) Date of Patent: Mar. 8, 2022

(54) TRANSPONDER

(71) Applicant: Intelligent Imaging Systems, Inc., Edmonton (CA)

(72) Inventors: Bruce Roesner, Banner Elk, NC (US); Brian Heath, Vancouver (CA)

(73) Assignee: Intelligent Imaging Systems, Inc., Edmonton (CA)

( * ) Notice: Subject to any disclaimer, the term of this patent is extended or adjusted under 35 U.S.C. 154(b) by 0 days.

(21) Appl. No.: 16/895,957

(22) Filed: Jun. 8, 2020

(65) Prior Publication Data

US 2020/0410313 A1 Dec. 31, 2020

Related U.S. Application Data

(63) Continuation of application No. 15/677,611, filed on Aug. 15, 2017, now Pat. No. 10,679,108.

(60) Provisional application No. 62/375,425, filed on Aug. 15, 2016.

(51) Int. Cl.
*G06K 19/06* (2006.01)
*G06K 19/07* (2006.01)
*G06K 19/073* (2006.01)

(52) U.S. Cl.
CPC ... *G06K 19/0723* (2013.01); *G06K 19/07345* (2013.01)

(58) Field of Classification Search
CPC .............. G06K 19/0723; G06K 19/07345
USPC ......................................... 235/492
See application file for complete search history.

(56) References Cited

U.S. PATENT DOCUMENTS

| | | | |
|---|---|---|---|
| 7,714,727 B2 | 5/2010 | White et al. | |
| 2007/0046469 A1* | 3/2007 | Pempsell | G06K 19/07749 340/572.1 |
| 2008/0006696 A1* | 1/2008 | Piersol | G06K 19/07381 235/451 |
| 2008/0106385 A1 | 5/2008 | Kelley et al. | |
| 2010/0194542 A1 | 8/2010 | Noakes et al. | |
| 2011/0205030 A1* | 8/2011 | Amtman | G08B 13/2431 340/10.5 |
| 2016/0203651 A1 | 7/2016 | Heath et al. | |
| 2017/0116507 A1 | 4/2017 | Home et al. | |

OTHER PUBLICATIONS

Breitenbach, "As Cashless Toll Roads Proliferate, So Do Rental Car Fees," Aug. 10, 2017, URL=http://www.pewtrusts.org/en/research-and-analysis/blogs/stateline/2017/08/10/as-cashless-toll-roads-proliferate-so-do-rental-car-fees, download date Aug. 2, 2018, 6 pages.

(Continued)

*Primary Examiner* — Ahshik Kim
(74) *Attorney, Agent, or Firm* — Seed Intellectual Property Law Group LLP

(57) ABSTRACT

A transponder with a disrupting signal source to shut down the transponder. The transponder may use an RFID chip. The disrupting signal source can be an electrical signal source electrically coupled to the RFID chip, for example capacitively coupled. The disruptive signal source can also be a radiation source, for example an infrared source. The disrupting signal source can be connected to a receiver to allow the transponder to be shut down remotely. Multiple transponders as described can be combined to form a multi-transponder device in which transponders can be shut down selectively.

5 Claims, 2 Drawing Sheets

(56) References Cited

OTHER PUBLICATIONS

Faraday for Transponders, "Electronic Toll Collection Transponders—Friend or Foe?" Mar. 7, 2017, URL=https://mosequipment.com/blogs/news/electronic-toll-collection-transponders-friend-or-foe, download date Aug. 2, 2018, 7 pages.
Hubbard, "How To Use a Florida SunPass," Jun. 2014, URL=https://www.slideshare.net/Ellehubbard/how-to-use-a-florida-sun-pass-when-hiring-a-rental-car-in-florida-35005532, download date Aug. 2, 2018, 9 pages.
Anotheruser et al., "Can a Rental Company FORCE You to Use their SunPass?" Jul. 2018, URL=https://forums.moneysavingexpert.com/showthread.php?t=5019785, download date Aug. 2, 2018, 5 pages.
MOS Equipment, "How to choose the right faraday bag for forensics," Feb. 9, 2016, URL=https://mosequipment.com/blogs/news/56937861-how-to-choose-the-right-faraday-bag-for-forensics, download date Aug. 2, 2018, 11 pages.
MOS Equipment, "Mission Darkness: Faraday Bags," URL=https://cdn.shopify.com/s/files/1/1018/3105/files/MissionDarkness_Brochure_0720.pdf, download date Aug. 2, 2018, 9 pages.
PlatePass, "Firefly™ Car Rental," URL=https://www.platepass.com/firefly.html, download date Aug. 2, 2018, 4 pages.
The Pew Charitable Trusts, image from Breitenbach, "As Cashless Toll Roads Proliferate, So Do Rental Car Fees," Aug. 10, 2017, URL=https://www.huffingtonpost.com/entry/as-cashless-toll-roads-proliferate-so-do-rental-car_us_598c6ce1e4b08a4c247f28b2, 1 page.

* cited by examiner

TRANSPONDER

CROSS-REFERENCE TO RELATED APPLICATION

This is a continuation of U.S. application Ser. No. 15/677,611, filed Aug. 15, 2017, now U.S. Pat. No. 10,679,108, which claims the benefit of U.S. Provisional Application No. 62/375,425, filed Aug. 15, 2016.

BACKGROUND

Technical Field

Transponders

Description of the Related Art

It is known for users to shield a vehicle mounted transponder to cause it not to function when a vehicle is driving on a highway. For example, a toll payment function of the transponder may be disabled by the expedience of shielding the transponder when passing a toll station.

BRIEF SUMMARY

There is disclosed in an embodiment, a transponder that may be non-mechanically disabled. The transponder may be associated with other transponders to form a multi-transponder device (MTD). The MTD allows a specific transponder to be activated while others are inactivated. If a specific transponder is associated with a specific toll payment level or other function, then the MTD provides function selectivity. For example, the MTD allows software control from a separate or integrated device to enable the transponder which provides the greatest discount at specific toll roads. Therefore, the MTD may house multiple shared protocol transponders that can be individually enabled/disabled by remote software such as, for example, the software disclosed in U.S. Pre-Grant Publication No. 2016/0203651, published Jul. 14, 2016, the content of which is incorporated herein by reference. The MTD has a non-mechanical switching feature to effectively enable/disable any housed transponder via a disrupting signal source such as low level electromagnetic or radiation means. A wireless interface is linked to and controlled by a smart device such as a smart phone. A remote control system may house all high-level application logic and control the non-mechanical switching feature via a wireless interface to the MTD.

BRIEF DESCRIPTION OF THE FIGURES

Embodiments will now be described with reference to the figures, in which like reference characters denote like elements, by way of example, and in which.

DETAILED DESCRIPTION

Immaterial modifications may be made to the embodiments described here without departing from what is covered by the claims.

There is disclosed in an embodiment, a transponder that may be non-mechanically disabled. The transponder may be associated with other transponders to form a multi-transponder device (MTD). The MTD allows a specific transponder to be activated while others are inactivated. If a specific transponder is associated with a specific toll payment level or other function, then the MTD provides function selectivity. For example, the MTD allows software control from a separate or integrated device to enable the transponder which provides the greatest discount at specific toll roads. Therefore, the MTD may house multiple shared protocol transponders that can be individually enabled/disabled by remote software such as, for example, the software disclosed in U.S. Pre-Grant Publication No. 2016/0203651, published Jul. 14, 2016, the content of which is incorporated herein by reference, and included with this patent specification. The MTD has a non-mechanical switching feature to effectively enable/disable any housed transponder without affecting the other transponders using a disrupting signal source such as via low level electromagnetic or radiation means. The transponders may be mounted on a vehicle in a conventional manner.

Figure 1:
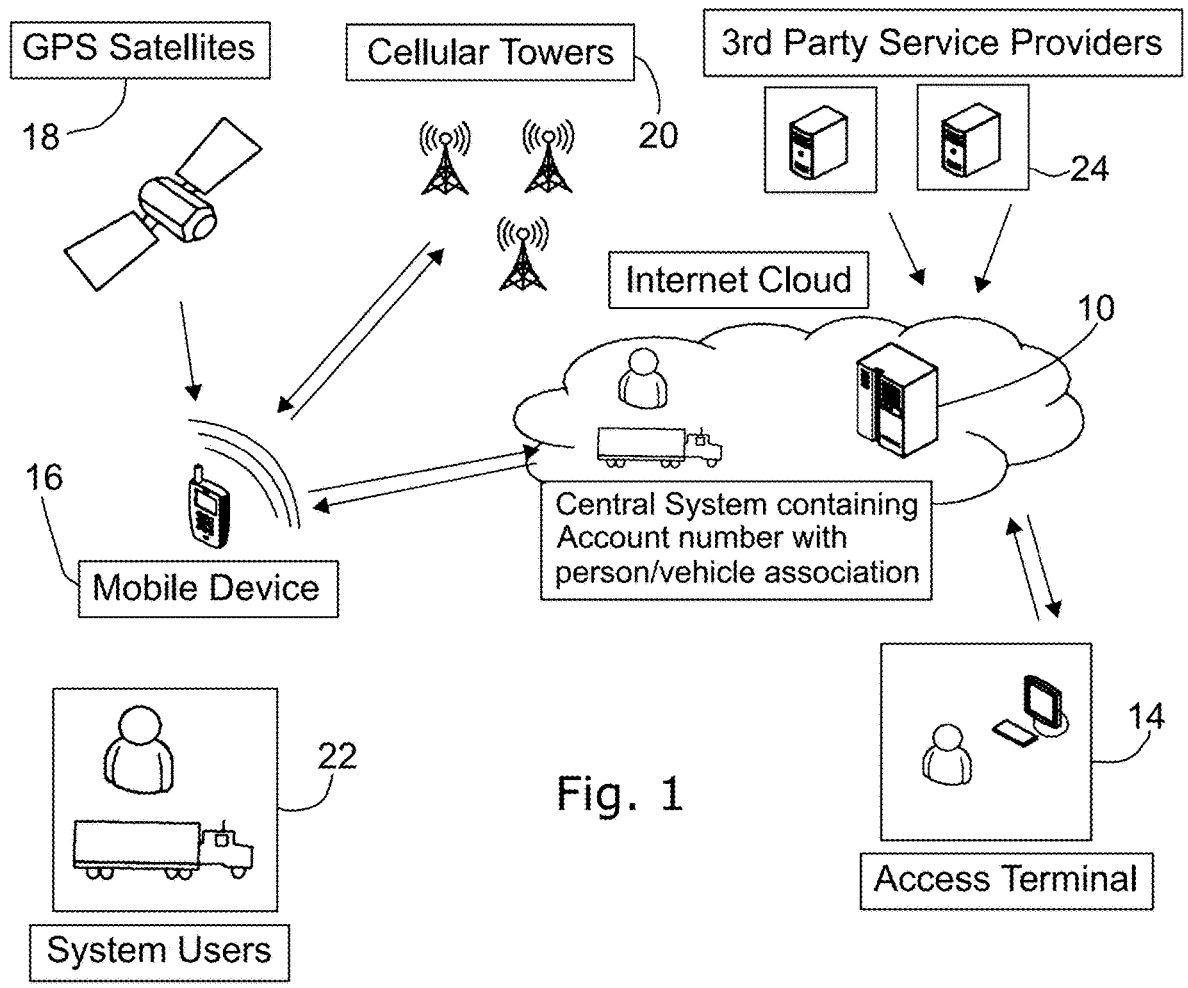
FIG. 1 is a network diagram showing a vehicle traffic control system with which transponder embodiments disclosed in this document may be used.
Figure 2:
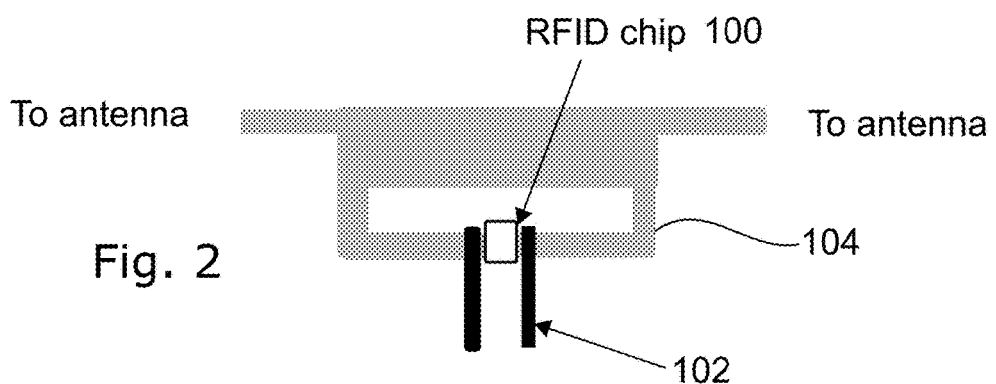
FIG. 2 is a diagram showing an RFID tag overlaid with metallic strips for coupling an AC signal into the RFID chip.
Figure 3:
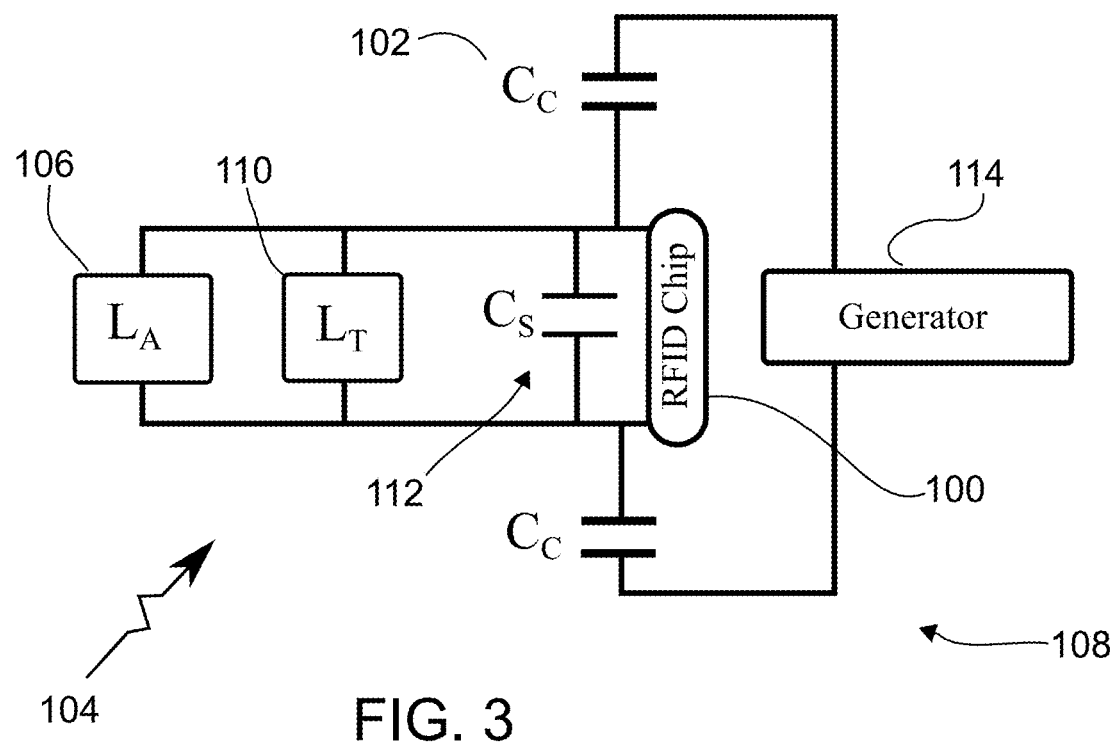
FIG. 3 is a schematic circuit diagram showing a circuit including the RFID tag and a disrupting circuit for disrupting the operation of the RFID tag.
Figure 4:
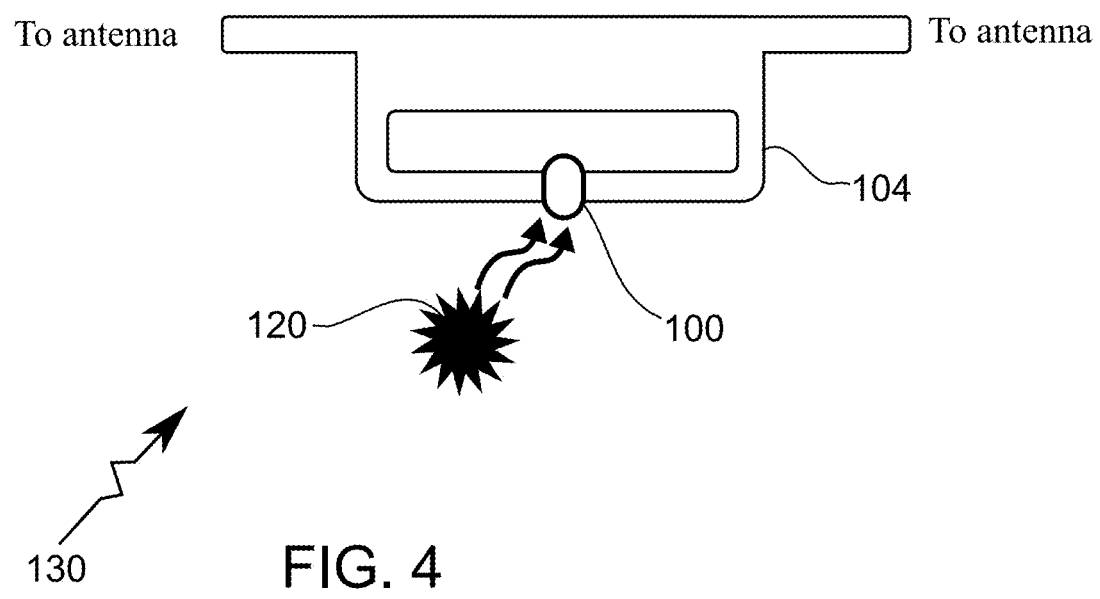
FIG. 4 is a diagram showing an RFID tag irradiated by a radiation source for disrupting the RFID tag.

The MTD, which may be designed for example as shown in FIGS. 2, 3, and 4 and discussed below, may be present with other MTDs of the same or similar type. The MTD may be controlled by a signal sent from an actuation device associated with each MTD. The actuation device may be a wireless device that can receive a signal from a smart phone or other smart device 16 carried by a vehicle. As shown in FIG. 1, a system that may be used in conjunction with an MTD comprises a central processing system 10 that uses one or more servers and related peripherals for connecting the server(s) to a telecommunications network such as the internet 12. The system is effected by configuration of the central processing system 10 using software that contains instructions for the servers to carry out the disclosed method steps. The servers need not be collocated and may reside in multiple servers (commonly referred to as the cloud) operated by a different party from the system operator. The servers may be accessed by a system operator through conventional input devices such as a keyboard or touch screen, and may be accessed through a conventional browser operating on a server, such as a local server 14 or through other software, such as dedicated software, operating on a server, such as a local server 14. The local server used by the system operator may be located anywhere in the world. The system 10 may also reside entirely or partly on the local server 14.

The communications channels shown in FIG. 1 by lines connecting the system elements may all be conventional communication channels. Examples of conventional communications channels include wireless links, optical links, or wired links. The system may be implemented by loading software into the system elements and thus configuring the system elements as disclosed in this patent document to interact with each other in a novel manner. The implementation of the software enables a uniquely configured relationship between the system elements. Communications between the central traffic control system 10 and mobile wireless device 16 and between the central system 10 and a third party provider 24 preferably is a web based service using internet protocol. In a web based service, a server seeking to use the service opens a port on the server and sends messages with a web address or URL into the network which is relayed through the network as packets that are combined and delivered to the specified URL on the destination server. As such, the communication channels need not be dedicated channels but may use multiple links in a telecommunications network. The web service may be one suitable for operation on the current internet or such equivalents and replacements that are developed.

The central system 10 interacts with a location-enabled mobile wireless device 16, such as a GPS-enabled smart phone. "Location-enabled" refers to the ability of the mobile wireless device 16 to determine its location by reference to a GPS system 18 or other wireless sources 20. The mobile wireless device 16 also incorporates a processor capable of being programmed to monitor the location of the device and determine when the device has entered a specific geographic area or fixed spatial location (geofence) such as an inspection site, for example a vehicle screening area or weigh station, toll location, or other transportation service site. A toll location includes a toll road, a toll lane on a roadway, and a toll station on a roadway depending on how tolls are collected on a particular road. The system 10 may work with a variety of toll systems including open road tolling systems where vehicles using a road are imaged and the image is used to process a toll. An inspection site for vehicles includes any site where law enforcement agencies carry out inspection of vehicles. A weigh station is an example of a vehicle inspection site.

The processor of the mobile wireless device 16 should be sufficiently powerful to process the instructions disclosed in this patent document, which is the case with most commercially available smart phones. The mobile wireless device 16 is normally expected to be carried by a system user such as an operator of a personal vehicle or commercial vehicle 22. However, the mobile wireless device 16 may also be a wireless computing device integrated with the vehicle, including a device integrated with vehicle electronics and power systems, and is mobile in the sense that it moves around with the vehicle. The mobile wireless device 16 may also be a personal computing device such as a laptop computer that may be carried by a person.

An RFID tag is an example of a tag suitable for use in an MTD. Various methods may be used to remove an RFID tag from a pool of tags. By simply placing another radiating device as a disrupting signal source in close proximity to an RFID tag, the communication between the tag and reader could be disrupted. To avoid interference with all other tags in proximity, the disabling signal or interference in this example needs to be orthogonal to other signals in the vicinity. That is, the disabling signal needs to be coded for only the equipment to be disabled.

Another technique is to capacitively couple a signal into the tag of interest to act as a disrupting signal so that either the incoming signal from the reader to the tag or the signal from the tag to the reader is not properly interpreted. It is also important that the capacitive coupling is limited so as not to interfere with the impedance matching between the RFID chip and antenna. FIG. 2 shows a typical RFID tag 100 on which there is overlaid two metallic strips 102 which allow for coupling an AC signal into the RFID chip. The RFID tag 100 is placed within a circuit 104 for connecting the RFID chip to an antenna 106 (not shown in FIG. 2, but indicated using a schematic element in FIG. 3). The circuit 104 is further shown schematically in FIG. 3 along with a disrupting circuit 108 for producing and coupling the AC signal into the RFID using the metallic strips.

The capacitance between the metallic strips is determined by the common area of the metallic strips and the conductive pattern of the tag as well as the space between them. Applying an AC signal of substantial amplitude and fast rise time will then disrupt the signals without interfering with other tags in close proximity.

A diode detector (sniffer) was placed in closed proximity to the RFID tag while communicating with the reader so that both the reader signal and tag response could be monitored with an oscilloscope and plotted.

The read distance of the tag was first measured. The metallic coupling strips were then sized and placed in close proximity to the RFID chip while monitoring the read distance to verify minimum degradation. It was found that with strips approximately 50 mils in width the read distance only decreased by about 1 dB (10%).

Subsequently a generator with a 20 volt amplitude and rise/fall times of 1.5 pec was turned on to act as a disrupting signal source.

The communication between the reader and tag was not disrupted but the monitoring showed that the external signal was very close to overwhelming the signals. However, the effect of the externally generated signal on the reader signal and tag response was not enough since the reader was still able to read the tag. The disruptive signal can be enhanced by increasing the capacitance, increasing the generator signal, and/or decreasing the rise/fall time. But increasing the capacitance will cause a degradation in the tag's read distance.

Therefore it was decided that using a simple driver with an increased amplitude (36 volts) and decreased rise time (200 nsec) will increase the coupled signal by a factor of 10 which, according to the plot of the reader signal and tag response as modified by the external signal, should be more than sufficient to disrupt the communication.

Thus one embodiment to disable a passive RFID tag is to capacitively couple an interfering signal into the tag using an external generator as a disrupting signal source. The original intent was to introduce a signal in the 100 KHz to 900 KHz (similar to tag's baud rate) with a fast rise/fall time in order to cause the RFID chip to "misunderstand" the incoming command from the reader thereby causing the tag to not respond. This method would not interrupt the RF signal in the vicinity so that other tags in close proximity could communicate with the reader.

FIG. 3 is a schematic identifying the electrical components associated with the RFID tag and the external generator, where $L_A$—Inductance of the antenna $L_T$—Tuning inductor $C_S$—Stray capacitance associated with the RFID chip and its attachment to the antenna $C_C$—Coupling capacitance determined by the overlapping area of the leads from the generator and RFID chip's antenna pattern The antenna 106, RFID chip 100, and tuning inductor 110 along with stray capacitance 112 together form circuit 104 which accounts for the normal operation of the RFID tag. The signal generator 114 and metallic strips 102 connect into this circuit to form disrupting circuit 108 for disrupting the operation of circuit 104 when generator 114 is active.

The generator 114 is used to introduce an interfering signal into the chip via the coupling capacitors. By doing so the RFID chip 100 cannot properly interpret the read command from the reader, thereby turning the RFID chip off. The tuning inductor 110 is used to optimize the tag's tuning in order to achieve longer read distances. Just about all passive tags use this component. Unfortunately the interfering signal in the 500 KHz range is so low relative to the tuning inductor's typical value (tuned for 900 MHz range) that the tuning inductor behaves more like a shorting bar to the interfering signal. The coupling capacitance was increased to allow more signal into the RFID chip but this has limits in that too high of a level of capacitance detunes the circuit thereby reducing the tag's read distance. Consequently, a sufficient signal could not be introduced to the RFID chip to terminate its operation when a tuning inductor was incorporated into the passive RFID tag.

In order to verify that the concept worked properly, the tuning inductor was severed (open circuit) and the tests repeated. As expected, eliminating the tuning inductor caused significant degradation to the tag's read distance. However, it was determined that with sufficient amplitude and coupling the tag's operation was interrupted. Table 1 lists the read rates versus the tag's read count. Initially it was thought that there was a correlation between frequency and operation but it became apparent that although the frequency probably had some affect, the amplitude of the signal was the dominant factor. The generator was limited to 30 volts but was frequency dependent. The maximum amplitude was achieved in the 800-900 KHz range. To confirm that the amplitude was the dominant factor, the amplitude was reduced from 29 volts to 25 volts when operated at 800 KHz and the read count performed. As noted in Table 1, the read count went back to the same level as if there were no interference.

TABLE 1

| Frequency (KHz) | Maximum Amplitude (Volts) | Read Count per Second | Increased Capacitance Coupling |
|---|---|---|---|
| No signal | NA | 720 | |
| 300 | 22 | 720 | |
| 400 | 23 | 717 | |
| 500 | 25 | 715 | |
| 600 | 27 | 711 | |
| 700 | 28 | 689 | |
| 800 | 29 | 676 | 515 |
| 900 | 29 | 656 | 518 |
| 990 | 28 | 657 | |
| 800 | 25* | 715 | |

*Voltage was intentionally reduced

As a variation on the test, the capacitance coupling was increased (increased common area between tag leads and generator leads). The results were very conclusive. With the increased coupling (more interference signal into the RFID chip), the read rates decreased dramatically (approximately 20%).

Subsequently it was decided to utilize radiation, specifically infrared light (IR), as a disrupting signal to disable the RFID chip. FIG. 4 shows components of a transponder 130 including an RFID tag 100, radiation source 120, and circuit 104. The RFID tag 100 is irradiated by the radiation source 120 for irradiating the RFID chip. As in FIG. 2, the RFID tag 100 is placed within the circuit 104 for connecting the RFID chip to an antenna. One might think that visible or ultraviolet light might be the light of choice but in reality infrared light has the advantage that it can pass through single crystal silicon (integrated circuit material). Longer wavelengths as compared to visible light can pass through even the backside of the RFID and cause the circuitry to stop functioning.

Multiple light sources were considered for the tests. Miniature incandescent lights of different intensity were considered as the disrupting signal source. The problems with incandescent lights are that they consume higher amounts of power and they have shorter lifetimes. Only a small portion of the light given off by incandescent lights are in the longer wavelength of IR. LED's are more efficient and last longer but are slightly more expensive. The incandescent lights were found to require the higher current in order to be effective. Although a 60 mA light was found to occasionally stop the operation of the tag, a higher current device (115 mA listed in Table 2) was found to be very consistent. The LED listed in Table 2 was selected as the disrupting signal source as it is the least expensive of the LED's (under $1.00) in the wavelength of interest and has a long lifespan of 20,000 hours. It was also found to be consistent in terminating the tag's operation when exposed to the back of the RFID chip. Below are the results of the tests.

TABLE 2

Light Interference

| Condition | Minimum Activation Energy (dBm)* | Light Source |
|---|---|---|
| No bulb | 12 | Bulb - 715A515, 5 volts, 70 mA |
| With Bulb (Off) | 11 | |
| With Bulb (On) | No function | |
| LED (Off) | 8 | LED - IR333-A, 940 nM, 100 mA |
| LED (On) | No function | |
| LED (On) 5-20 KHz | No function | |

*MAE is the inverse of read distance. The tags tested had read distances in the 25 foot range Another advantage of LED's is that they can be duty cycled to reduce power consumption and extend lifetime. Due to equipment limitations during the test, only a 50% duty cycle was generated. As noted on the last line of Table 2, the duty cycling allowed blockage of the chip operation. The specification for the IR 333-A LED indicates that it will operate with a 100 μsec pulse which would correlate to an extension of the part lifetime to well over 200,000 hours.

CONCLUSION

Both RF and IR interference cause the RFID tag to cease operation and, when properly implemented, do not disrupt other tags in close proximity. However, the IR method appears to be much more cost effective.

For capacitively coupling of the disabling signal, a wide range of voltages exist that would disable the tag/reader communication without damaging the chip. The voltage applied should be below the level of damage.

The intent of the capacitive coupling rather than E-field is to limit the proximity effect. Therefore, other tags within the field of the first tag (½ wavelength or approximately 6") would not be effected with the capacitance coupling.

The system 12 is a software configured computer of any type with sufficient processing capacity. The software is configured to identify when a device 16 is near a toll station via the GPS capacity of the device 16 and to determine, by reference to a database, for example with information from third party providers, such as toll rates, which transponder needs to be activated for a given toll station. The system 12 then sends a signal to the device 16, which in turn sends a signal (for example using Bluetooth™ or other radio frequency device) to an actuation device to activate the generator of one or more of the transponders and thus disable the one or more transponders. Various signaling methods may be used to identify the transponder to be disabled, such as a code in the signal sent to the generator.

In the claims, the word "comprising" is used in its inclusive sense and does not exclude other elements being present. The indefinite articles "a" and "an" before a claim feature do not exclude more than one of the feature being present. Each one of the individual features described here may be used in one or more embodiments and is not, by virtue only of being described here, to be construed as essential to all embodiments as defined by the claims.

What is claimed is:

1. A transponder comprising an RFID chip and a disrupting electrical signal source capacitively coupled to the RFID chip using metallic strips overlaying the RFID chip, and configured to send a disrupting signal to disrupt the RFID chip via the capacitive coupling in response to a control signal.

2. The transponder of claim 1 in which the controlling signal is a radio signal.

3. A machine configured for selectively disabling multiple transponders via a respective disrupting signal source associated with each transponder and configured to send a disruptive signal to disrupt the respective transponder via a respective capacitive coupling, at least one of the respective capacitive couplings comprising metallic strips overlaying an RFID chip of the respective transponder.

4. A multi-transponder device comprising:
   multiple transponders, each transponder comprising a respective RFID chip and a respective disrupting electrical signal source capacitively coupled to the respective transponder, at least one of the respective disrupting electrical signal sources being capacitively coupled to the respective RFID chip using metallic strips overlaying the RFID chip; and
   one or more receivers for controlling the respective disrupting electrical signal sources of the multiple transponders, the respective disrupting electrical signal sources of the multiple transponders each being responsive to at least one of the one or more receivers to provide a disrupting signal for disabling the respective transponder.

5. The multi-transponder device of claim 4 in which the one or more receivers are configured to control the disrupting electrical signal sources in response to a radio control signal.

* * * * *